Dec. 1, 1931.  M. TIBBETTS  1,834,112
SHOCK ABSORBER
Filed Dec. 16, 1927
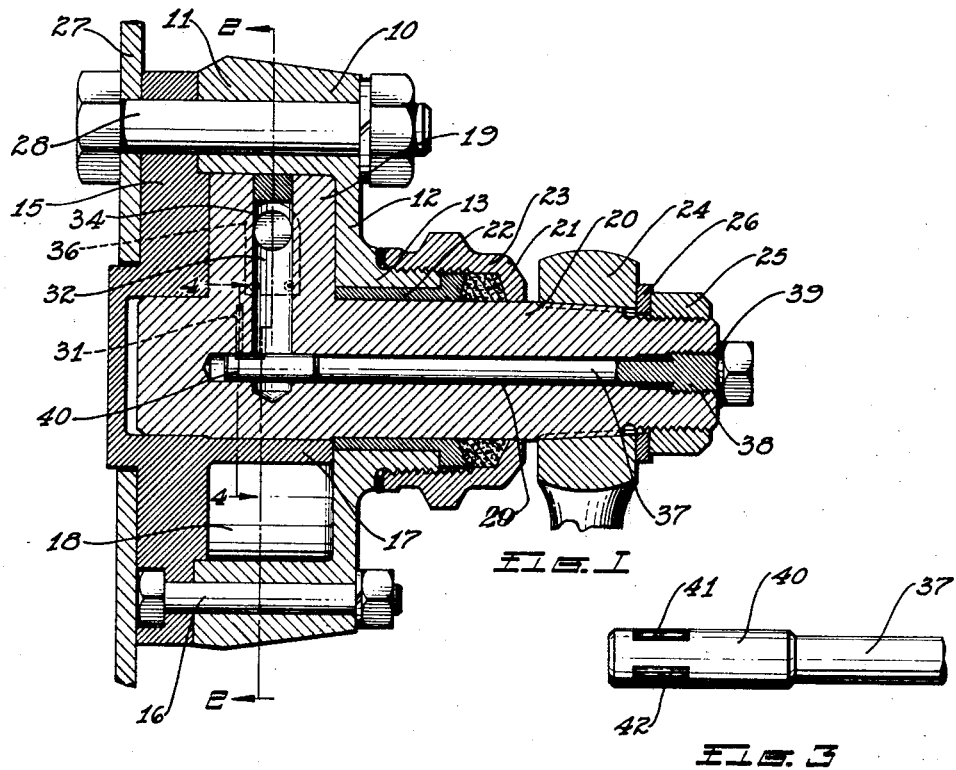
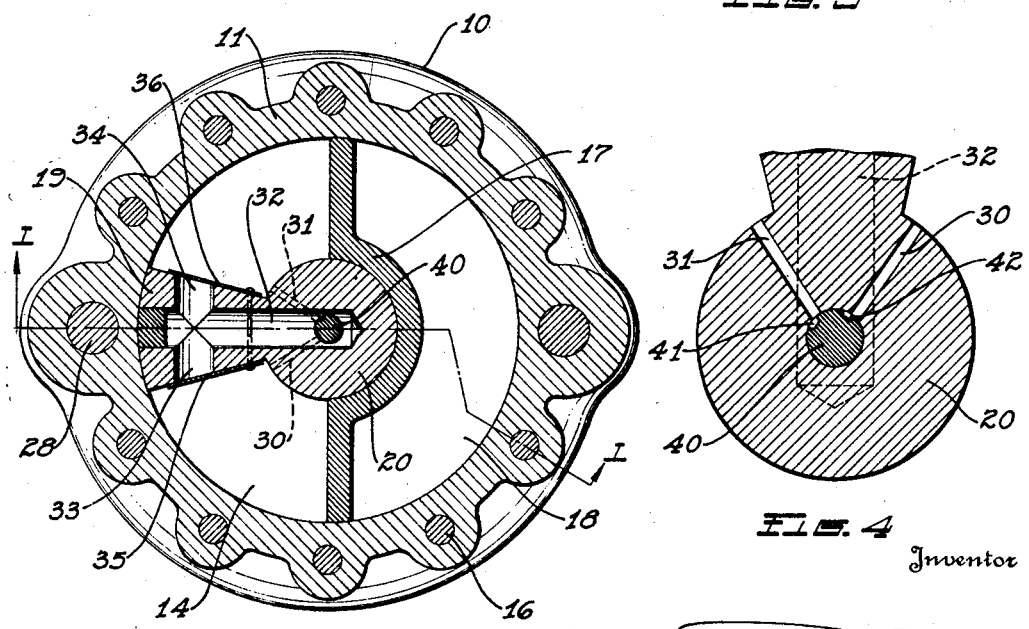
Inventor
Milton Tibbetts Patented Dec. 1, 1931

1,834,112

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

SHOCK ABSORBER

Application filed December 16, 1927. Serial No. 240,602.

This invention relates to motor vehicles and particularly to shock absorbers of the hydraulic type used on such vehicles between the frame and axle or between other relatively moving parts.

In hydraulic shock absorbers of the oscillating vane piston type, upon movement of the piston under shock liquid is usually by-passed under considerable pressure around the piston, the pressure of the liquid depending upon the shock being absorbed. The area of the by-pass around the piston is ordinarily controlled by some valve device such as a needle valve mounted in position in the by-pass from the outside of the absorber casing, and the needle valve is rather elaborately packed near its outside end to prevent leakage from the absorber casing around the needle valve. But due to the pressure at which the liquid is by-passed, the pressure reaching at times as high as 3000 pounds per square inch, even the most elaborate form of packing will not entirely prevent leakage around the needle valve.

An object of the present invention is to provide a hydraulic shock absorber with means to prevent leakage of the liquid therefrom around the by-pass needle valve.

Another object of the invention is to reduce the pressure of the by-passed liquid around the by-pass needle valve of a hydraulic shock absorber.

Another object of the invention is to obviate the necessity for an elaborate packing around the by-pass needle valve of a hydraulic shock absorber.

Other objects of the invention will appear from the following description taken in connection with the drawings which form a part of this specification, and in which:

Fig. 1 is a sectional view of a shock absorber embodying my invention, the section being substantially on line 1—1 of Fig. 2;

Fig. 2 is a section through the shock absorber taken substantially on line 2—2 of Fig. 1;

Fig. 3 is an enlarged detail view illustrating the needle valve employed in the shock absorber of the present invention, and Fig. 4 is an enlarged sectional view substantially on line 4—4 of Fig. 1.

Referring to the drawings, 10 is the body or casing of the shock absorber having a cylindrical portion 11, an end wall 12 and a bearing portion 13. The cylindrical portion and end wall are machined internally to form a working chamber 14 for the shock absorber. A cover 15 is fitted over the open end of the casing and is secured thereto by numerous bolts 16. The cover 15 has an extension 17 fitting into the cylindrical portion 11 of the casing, the extension cooperating with the body or casing of the shock absorber to form an auxiliary reservoir or reserve tank 18. A suitable filling opening (not shown) is provided and both the working chamber and the reserve tank are substantially filled with any suitable liquid such as oil or glycerine.

A piston 19 mounted to oscillate in the working chamber 14 has a shaft 20 suitably supported in the casing and cover. A packing 21 is compressed against bearing sleeve 22 by a hollow nut 23 screwed on the bearing portion 13 of the casing. Outwardly of nut 23 an arm 24 is keyed or otherwise suitably connected to the shaft 20 and is held thereon by nut 25 and lock washer 26. The shock absorber is shown mounted upon a support 27 by means of two large bolts 28 extending through suitable openings in the casing and cover. Arm 24 is adapted for connection in any suitable manner to a part which moves relatively to the support 27 so that piston 19 will be operated in the working chamber as the vehicle parts move relatively to each other. To permit arm 24 to operate with somewhat less resistance when moving in one direction than in the other, piston 19 is provided with a check valve (not shown) which permits liquid in the working chamber to pass relatively freely through the piston in one direction, but does not permit the liquid to pass through in the other direction.

Provision is made for by-passing some of the liquid equally on both strokes of the piston and in the shock absorber shown, this by-pass means is in both the piston and shaft. Shaft 20 is drilled from its outer end inwardly providing an opening 29 that extends through the zone of the piston. Two relatively small radial passages 30 and 31, hereinafter termed high pressure passages, connect with opening 29 and extend to opposite sides of the piston and a relatively large passage 32, hereinafter termed a low pressure passage, extends through piston 19 and connects opening 29 with the working chamber on opposite sides of the piston through short passages 33 and 34 in the piston having substantially the same cross-sectional area as the low pressure passage 32. Suitable check valves 35 and 36 cooperate with the short passages 33 and 34 to permit the by-passed liquid to enter the working chamber only on the receding side of the piston. A needle valve 37 threaded into the shaft 20 as at 38 makes a tight joint with the end of the shaft by means of packing 39. Needle valve 37 is provided with a somewhat enlarged head 40 fitting snugly in the inner end of opening 29 in shaft 20. Two shallow passages 41 and 42 are provided in head 40 at an angle to each other corresponding to the angle included between the high pressure passages 30 and 31 and serve to connect these passages with low pressure passage 32. The cross-sectional area of this connection may be varied by simply turning the needle valve up tighter in the shaft or backing it off slightly, as will be apparent from Figs. 2 and 4 of the drawings.

Liquid by-passed around the piston is forced at relatively high pressure into high pressure passage 30 or 31 depending upon the direction in which the piston is moving and is conducted through connecting passage 41 or 42 in the head of the needle valve to the relatively large low pressure passage 32. Immediately upon entering low pressure passage 32 the pressure of the liquid is released, due to the large space into which it is permitted to expand, after which it passes into the working chamber on the receding side of the piston through passage 33 or 34 and check valve 35 or 36. The liquid is thus conducted through a by-pass having a high pressure portion comprising high pressure passage 30 or 31 and connecting passage 41 or 42 in the needle valve head, and a low pressure portion comprising relatively large low pressure passage 32 and short passage 33 or 34. It will be noted that low pressure passage 32 is preferably large enough to completely surround needle valve head 40 so that the pressure of the by-passed liquid will be reduced all around the needle valve. In addition to this, low pressure passage 32 is preferably placed intermediate the high pressure passages 30 and 31 and the outside end of the needle valve to eliminate any possibility of leakage of the liquid around the needle valve. In other words, since the low pressure portion 32 of the by-pass is placed between the high pressure portion 30 or 31 and the outside end of the needle valve, the pressure of the liquid is reduced all around the needle valve at a considerable distance from the outside end of the needle valve and there is consequently no tendency for the liquid to be forced out of the absorber around the needle valve. The necessity for the elaborate packing heretofore found necessary around the outer end of the by-pass needle valve is thus obviated. In place of the elaborate packing, the simplest form of packing will suffice, or it may be found that no packing whatever is required because the screw thread connection between the needle valve and the shaft 20 will be sufficient to prevent leakage around the stem of the needle valve.

A shock absorber constructed in accordance with the present invention effectually prevents the leakage of liquid therefrom around the by-pass needle valve by the comparatively simple expedient of reducing the pressure of the by-passed liquid around a portion of the needle valve, and thus obviates the necessity for the elaborate packing heretofore required around the outer end of such needle valve.

It will be understood that various forms of the invention other than those described above may be used without departing from the spirit or scope of the invention.

Having thus described my invention, what I claim and desire to secure by Letters Patent is:

1. In a shock absorber, a casing, a piston operable in the casing, a by-pass comprising high and low pressure passages connecting the interior of the casing on opposite sides of the piston and a needle valve having a portion extending outside of the casing providing communication between the high and low pressure passages, the low pressure passage being positioned intermediate the high pressure passage and that portion of the needle valve extending outside of the casing.

2. In a shock absorber, a casing, a piston operable in the casing, a by-pass connecting opposite sides of the piston, the by-pass having both high and low pressure passages and a needle valve extending through the low pressure passage and providing a connection between the high and low pressure passages.

3. In a shock absorber, a casing, a piston operable in the casing, a shaft for the piston, a by-pass connecting opposite sides of the piston comprising a high pressure passage in the shaft and a low pressure passage in the piston and shaft and a needle valve providing a connection between the high and low pressure passages.

4. In a shock absorber, a casing, a piston operable in the casing, and a by-pass connecting opposite sides of the piston comprising a high pressure passage of relatively small cross-sectional area and a low pressure passage of relatively large cross-sectional area connected together.

5. In a shock absorber, a casing, a piston operable in the casing, a by-pass connecting opposite sides of the piston comprising a high pressure passage and a low pressure passage and a needle valve providing a connection between the high and low pressure passages, said low pressure passage entirely surrounding a portion of the needle valve.

6. In a shock absorber, a casing, a liquid in the casing, a piston operable in the casing, a shaft for the piston, by-pass means around the piston comprising a high pressure passage in the shaft and a low pressure passage in the piston and shaft, a needle valve mounted in the shaft and providing a connection between the high and low pressure passages and having a portion extending outside of the shaft, said low pressure passage being positioned intermediate the high pressure passage and the portion of the needle valve extending outside of the shaft, said low pressure passage entirely surrounding a portion of the needle valve.

7. In a shock absorber, a casing, a liquid in the casing, a piston operable in the casing, and means including a valve member for by-passing the liquid in the casing from one side of the piston to the other and for reducing the pressure of the liquid while passing through the by-pass, the valve member having passages forming a part of the by-pass.

8. In a shock absorber, a casing, a liquid in the casing, a piston operable in the casing, a by-pass around the piston and a needle valve for the by-pass, said by-pass being constructed with different cross sectional area to reduce the pressure of the by-passed liquid at adjacent portions of the needle valve.

In testimony whereof I affix my signature.

MILTON TIBBETTS.